(12) United States Patent
Wentink

(10) Patent No.: US 9,445,253 B2
(45) Date of Patent: *Sep. 13, 2016

(54) METHODS AND APPARATUS FOR SCANNING FOR MESH NODES

(76) Inventor: Maarten Menzo Wentink, Naarden (NL)

(*) Notice: Subject to any disclaimer, the term of this patent is extended or adjusted under 35 U.S.C. 154(b) by 516 days.

This patent is subject to a terminal disclaimer.

(21) Appl. No.: 12/429,118

(22) Filed: Apr. 23, 2009

(65) Prior Publication Data

US 2009/0274083 A1 Nov. 5, 2009

Related U.S. Application Data

(60) Provisional application No. 61/049,178, filed on Apr. 30, 2008.

(51) Int. Cl.
*G08C 17/00* (2006.01)
*H04W 8/00* (2009.01)
*H04W 40/00* (2009.01)
*H04W 40/24* (2009.01)
*H04W 48/08* (2009.01)
*H04W 84/18* (2009.01)
*H04W 52/02* (2009.01)

(52) U.S. Cl.
CPC ............ *H04W 8/005* (2013.01); *H04W 40/005* (2013.01); *H04W 40/246* (2013.01); *H04W 48/08* (2013.01); *H04W 52/0219* (2013.01); *H04W 84/18* (2013.01)

(58) Field of Classification Search
CPC ...................................................... G08C 17/00
USPC ........................................................ 370/311
See application file for complete search history.

(56) References Cited

U.S. PATENT DOCUMENTS

| 8,018,882 | B1* | 9/2011 | Chhabra ..................... 370/310 |
| 2002/0123345 | A1 | 9/2002 | Mahany et al. |
| 2002/0181423 | A1* | 12/2002 | Chen .................. H04L 12/1877 370/337 |
| 2004/0114521 | A1 | 6/2004 | Sugaya |
| 2004/0230638 | A1 | 11/2004 | Balachandran et al. |
| 2004/0253996 | A1 | 12/2004 | Chen et al. |
| 2005/0129009 | A1 | 6/2005 | Kitchin |
| 2005/0177639 | A1 | 8/2005 | Reunamaki et al. |
| 2006/0028984 | A1 | 2/2006 | Wu et al. |
| 2006/0280140 | A9* | 12/2006 | Mahany et al. ............. 370/329 |

(Continued)

FOREIGN PATENT DOCUMENTS

| CN | 1574829 A | 2/2005 |
| CN | 1806264 A | 7/2006 |

(Continued)

OTHER PUBLICATIONS

NPL document IEEE Std 802.11-2007, Part 11: Wireless LAN Medium Access Control (MAC) and Physical Layer (PHY) Specifications, dated Jun. 12, 2007.*

(Continued)

*Primary Examiner* — Gregory Sefcheck
*Assistant Examiner* — Majid Esmaeilian

(57) ABSTRACT

Methods and apparatus are provided for scanning for mesh nodes. A communication device monitors a shared communication channel to detect receive window start frames indicating that a mesh node is awake and available to receive data. The scanning device transmits a probe request during the awake window.

24 Claims, 8 Drawing Sheets

(56) References Cited

U.S. PATENT DOCUMENTS

| | | |
|---|---|---|
| 2007/0086399 A1 | 4/2007 | Akiyama |
| 2007/0206517 A1 | 9/2007 | Kakani |
| 2007/0226351 A1 | 9/2007 | Fischer et al. |
| 2007/0242634 A1 | 10/2007 | Calcev et al. |
| 2007/0242695 A1* | 10/2007 | Xu ................. H04W 48/08 370/468 |
| 2007/0286136 A1 | 12/2007 | Rittle et al. |
| 2007/0287456 A1 | 12/2007 | Shimizu |
| 2007/0297375 A1 | 12/2007 | Bonta et al. |
| 2008/0070523 A1 | 3/2008 | Masri et al. |
| 2008/0080475 A1 | 4/2008 | Orth et al. |
| 2008/0095091 A1 | 4/2008 | Surineni et al. |
| 2008/0095126 A1 | 4/2008 | Mahany et al. |
| 2008/0112347 A1 | 5/2008 | Gossain et al. |
| 2008/0151814 A1 | 6/2008 | Jokela |
| 2008/0170552 A1* | 7/2008 | Zaks ................. H04W 52/0229 370/338 |
| 2008/0267105 A1 | 10/2008 | Wang et al. |
| 2009/0026852 A1 | 1/2009 | Mall et al. |
| 2009/0201860 A1* | 8/2009 | Sherman et al. .......... 370/329 |
| 2009/0232042 A1 | 9/2009 | Kneckt et al. |
| 2009/0268652 A1 | 10/2009 | Kneckt et al. |
| 2009/0274082 A1 | 11/2009 | Wentink |
| 2009/0279487 A1* | 11/2009 | Reumerman et al. ........ 370/329 |
| 2010/0054214 A1* | 3/2010 | Igarashi ............ H04W 52/0216 370/336 |

FOREIGN PATENT DOCUMENTS

| | | |
|---|---|---|
| CN | 1898900 A | 1/2007 |
| CN | 101087172 A | 12/2007 |
| CN | 101164255 A | 4/2008 |
| CN | 101193066 A | 6/2008 |
| JP | 2006093787 A | 4/2006 |
| JP | 2006314121 A | 11/2006 |
| JP | 2006325175 A | 11/2006 |
| WO | 2006134472 A2 | 12/2006 |
| WO | 2007044597 | 4/2007 |
| WO | 2008019140 A2 | 2/2008 |

OTHER PUBLICATIONS

International Search Report and Written Opinion—PCT/US2009/042407, International Search Authority—European Patent Office—Aug. 24, 2009.

Shih-Lin Wu et al: "An energy efficient MAC protocol for IEEE 802.11 WLANs" Communication Networks and Services Research, 2004. Proceedings. Second Annual Conference on Freeericton, NB,Canada May 19-21, 2004, Piscataway, NJ,USA, IEEE , May 19, 2004, pp. 137-145, XP010732725.

* cited by examiner

METHODS AND APPARATUS FOR SCANNING FOR MESH NODES

CLAIM OF PRIORITY UNDER 35 U.S.C. §119

The present Application for Patent claims priority to Provisional Application No. 61/049,178 entitled "Methods and Apparatus for Scanning for Mesh Nodes" filed Apr. 30, 2008, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

Ser. No. 12/429,114, entitled "METHODS AND APPARATUS FOR POWER SAVING FOR MESH NODES," filed concurrently herewith, assigned to the assignee hereof, and expressly incorporated by reference herein.

BACKGROUND

1. Field

This application relates generally to mesh networks, and more particularly to scanning for mesh nodes in a mesh network.

2. Background 802.11 is a set of IEEE standards that govern wireless networking transmission methods. Several versions of 802.11 are used to provide wireless connectivity in the home, office and some commercial establishments. IEEE standards include versions 802.11a, 802.11b, 802.11g, etc. IEEE 802.11s is a draft IEEE 802.11 amendment for mesh networking. Mesh networking defines how wireless devices interconnect, creating an ad-hoc network.

A mesh network may be defined as two or more nodes that are interconnected via IEEE 802.11 links which communicate vie mesh services and comprise an IEEE 802.11 based Wireless Distribution System (WDS). Mesh networking is a way to route data, voice and instructions between nodes. It allows for continuous connections and reconfiguration around broken or blocked paths by "hopping" from node to node until the destination is reached. A mesh network whose nodes are all connected to each other is a fully connected network. Mesh networks differ from other networks in that the component parts can all connect to each other via multiple hops, and they generally are not mobile. Mesh networks can be seen as one type of ad hoc network.

Mesh networks are self-healing. This means that the network can continue to operate even when a node breaks down or a connection goes bad. As a result, a very reliable network is formed. This concept is applicable to wireless networks, wired networks, and software interaction.

Mesh points not yet members of a mesh network may first perform a discovery process to connect to the network. However, some mesh nodes enter a power saving mode during which they are not transmitting any data or signals. Accordingly, a mesh memory scanning for other nodes would be unaware of those nodes in the power saving mode. As such, it would be desirable to have a method of scanning for mesh modes in a power saving mode.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for scanning for a mesh network comprises determining an awake window associated with a mesh node in power save mode; sending a probe request to the mesh node during the awake window, and receiving a probe response from the mesh node in power save mode.

According to some aspects, an apparatus comprises a processor and a network scanning module, the network scanning module configured to detect a receive window associated with one or more mesh nodes.

According to some aspects, an apparatus comprises means for determining an awake window associated with a mesh node in a power save mode and means for sending a probe request to the mesh node during the awake window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
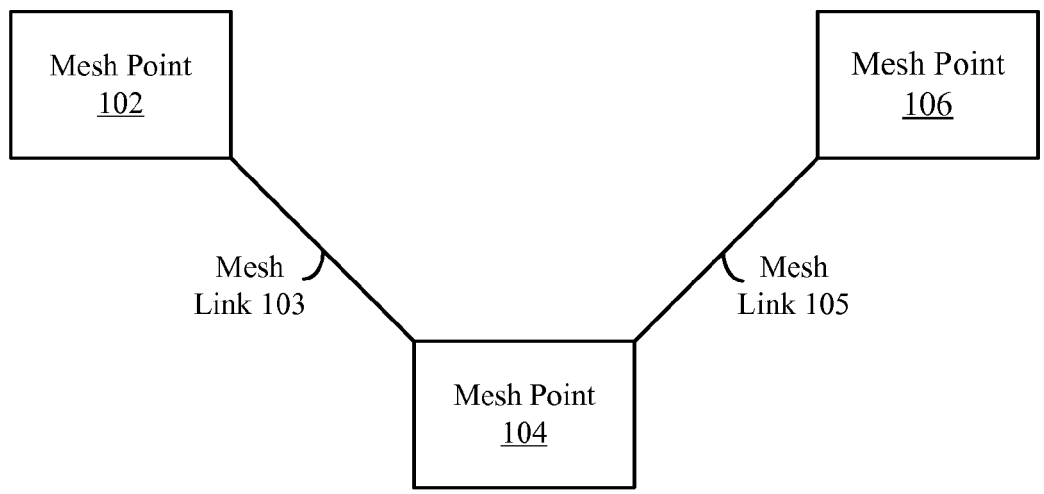
FIG. 1 is an example of a mesh network, in accordance with various disclosed aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for peer-to-peer (e.g., mobile-to-mobile) ad hoc network systems, such as, 802.xx wireless LAN, BLUETOOTH and any other short- or long-range, wireless communication techniques. Further, these techniques and networks may be used in combination with various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 depicts an exemplary mesh network 100 in which the inventive mechanisms and techniques described herein can be implemented. Mesh network 100 may include a plurality of mesh points (MP), such as MP 102, MP 104, and MP 106. Each mesh point may be linked or connected (through a wired or wireless link) to another mesh point through a mesh link (ML). For example, MP 102 and MP 104 are linked through mesh link 103. Similarly, MP 104 is linked to MP 106 through MP 105. It is noted that a mesh point can be an individual device that uses mesh services to communicate with other devices in the network, an access point (e.g., an 802.11 access point), or a gateway to other networks (e.g., non-mesh networks). Individual devices may include, for example, mobile phones, laptops, personal computers, handheld communication devices, satellite radios, global positioning systems, personal digital assistants (PDAs), and/or any other suitable device.

Figure 2:
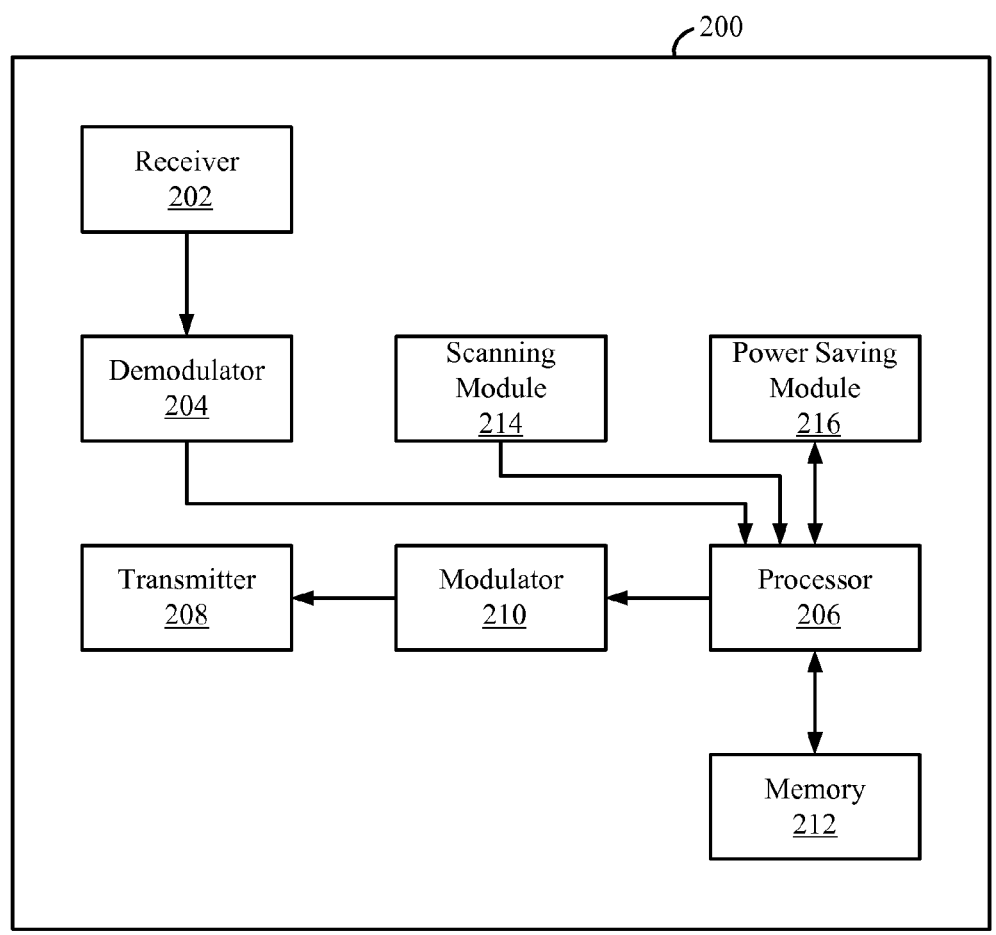
FIG. 2 depicts a mesh point, in accordance with various disclosed aspects.

FIG. 2 depicts an exemplary device 200 operating as a prospective mesh point in a mesh network. Device 200 may comprise a receiver 202, demodulator 204, processor 206, transmitter 208, modulator 210, and memory 212. Receiver 202 may receive a signal and perform typical actions thereon, such as filtering, amplifying, downconverting, etc. Receiver 202 may provide digitized samples to demodulator 204 which demodulates the received signals and provides them to processor 206 for channel estimation. Processor 206 may be configured to analyze information received by receiver 202 and generate information for transmission by transmitter 708. Processor 206 may be further configured to control one or more components of device 200. Memory 212 may store information needed by other components of device 200.

Device 200 may further comprise a scanning module 214, which allows a device to discover and join an existing mesh network, and a power saving module 216 which enables mesh points to enter a power save mode. Devices searching for a network can locate other nodes which may be implementing a power saving mode.

Figure 3:
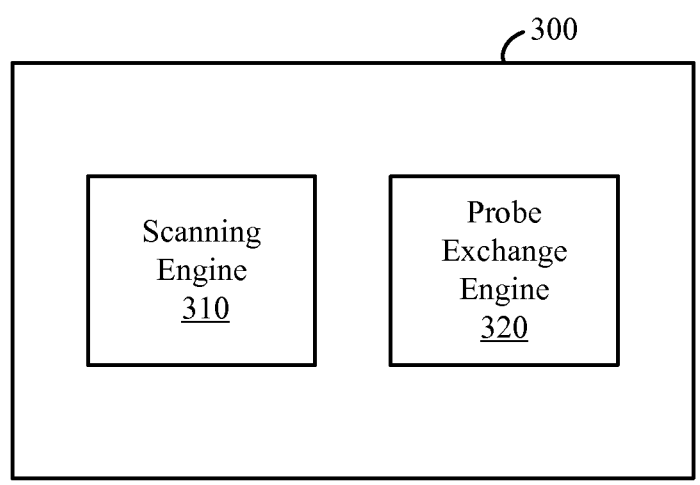
FIG. 3 depicts a scanning module, in accordance with various disclosed aspects.

FIG. 3 depicts a scanning module 300, in accordance with various aspects. Scanning module 300 may comprise a scanning engine 310 and a probe exchange engine 320. Scanning engine 310 may be configured to passively monitor a communications channel to detect transmissions. That is, the node listens to the channel without transmitting any data. According to some aspects, the scanning engine 310 may be configured to recognize receive window start (Rx-WinStart) frames.

Probe exchange engine 320 may be configured to transmit probe requests and to receive and process probe responses. A probe request is a message transmitted by a device to request capability information from recipient devices. The probe request may be transmitted as a broadcast message (e.g., one-to-many) or as a unicast message (e.g., one-to-one). A broadcast probe request message may be transmitted without waiting for an awake window. In accordance with some aspects, when scanning engine 310 detects a transmission on the communication channel, such as a receive window start frame, probe exchange engine 320 sends a probe request to the device generating the transmission.

The receive window start frame may identify the source of the message. For example, the receive window start frame may include the name and/or address of the transmitting node. Thus, the probe exchange engine 320 may send a message directly to the source. As the scanning module is not yet a member of the mesh, it is unaware of the awake schedule of other nodes. Accordingly, the probe request may be sent upon detection of the receive window start frame so that the probe request arrives within the receive window. Probe exchange engine 320 may also be configured to receive probe responses in response to its probe requests. The probe response may proxy capability information from other nearby nodes in the same mesh network, and may also proxy capability information from nearby nodes in other mesh networks.

Figure 4:
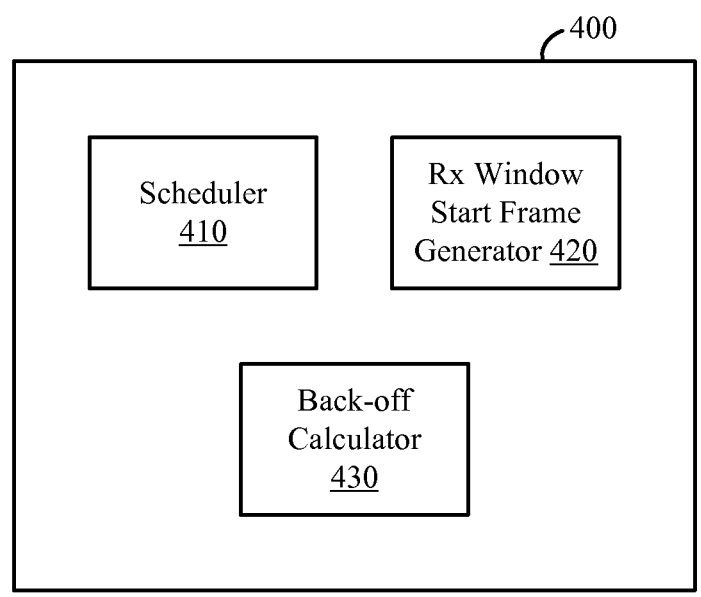
FIG. 4 depicts a power saving module, in accordance with various disclosed aspects.

FIG. 4 depicts a power saving module 400. Power saving module 400 may comprise a scheduler 410, a receive window start frame generator 420, and a backoff calculator 430. Scheduler 410 may be configured to exchange awake time schedules with other mesh network members. In some aspects, the schedule information is provided upon joining a mesh network. In some other aspects, the schedule information is provided at some other time after joining the mesh network. As such, a node is aware of the awake schedule of power saving nodes with which it has a mesh connection. It is during the awake window (also referred to herein as a receive window or awake period) that a power save node is available to accept data.

Receive window start frame generator 420 may generate and transmit an RxWinStart frame prior to each awake window. According to some aspects, the RxWinStart frame may be substantially smaller in size than a beacon, thereby saving additional power for the transmit mesh node and the receive mesh node. In other aspects, a beacon frame may transmitted as a receive window start frame, indicating that the associated mesh node is not in a power save mode. The RxWinStart frame may include, among other things, a length indicator indicating the length of the upcoming awake window. The length may be expressed in a variety of units such as, for example, a time period, or a number of slots.

According to some aspects, receive window start frame generator 420 may be further configured to include mesh network identifying information in the receive window start frame. For example, the start frame may include all or part of the mesh network's associated mesh ID. The start frame may also include a time stamp for synchronizing connected mesh nodes.

To minimize and/or avoid collisions, backoff slot calculator 430 may be configured to determine a backoff to be used by a node prior to transmitting data. According to some aspects, a node may generate a random number, and wait the random number of slots prior to transmitting. The random number should be less than or equal to the backoff slot length of the destination node, if the length of the awake window is defined as a number of backoff slots. The backoff may be determined according to the channel access mechanism that governs access to the channel, for example, the Enhanced Distributed Channel Access (EDCA) as defined in IEEE P802.11-2007.

According to some aspects, devices not implementing a power save mode or devices that did not enter a power save mode may also transmit receive window start frames. The receive window start frames may indicate a permanent awake window.

Figure 5:
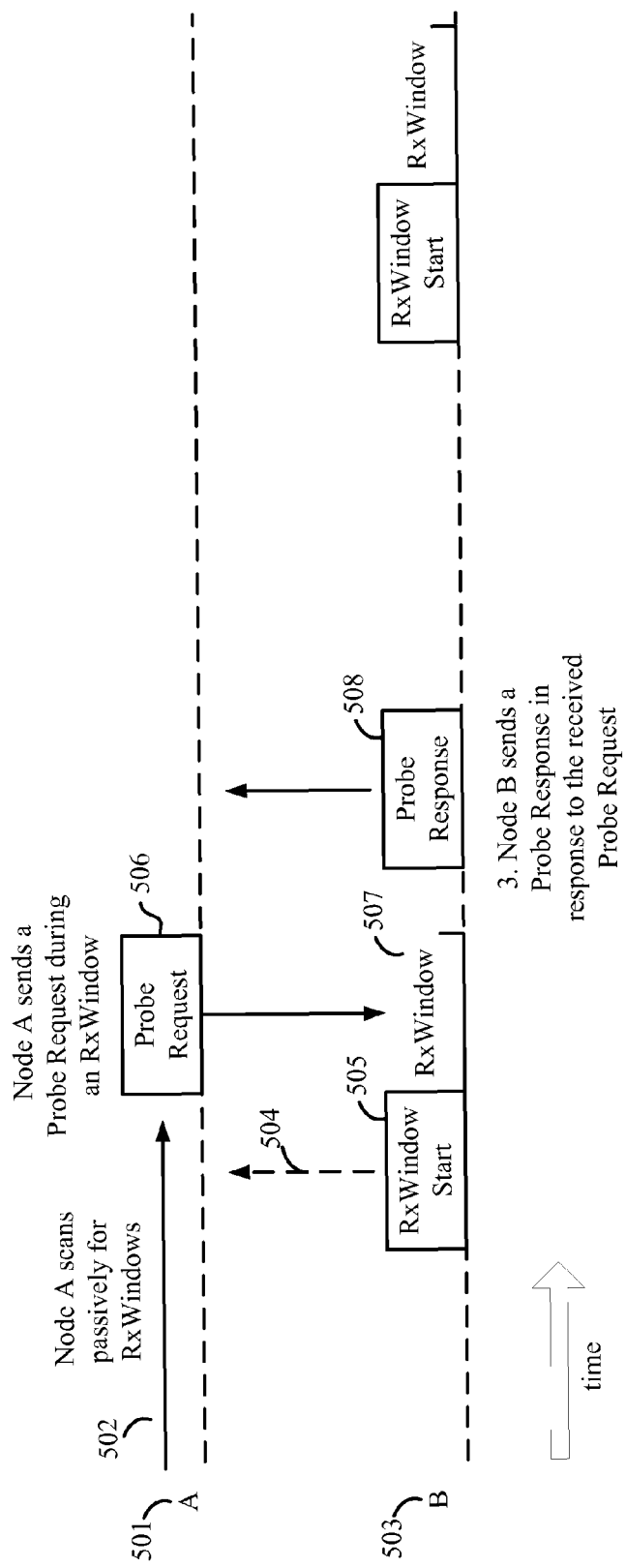
FIG. 5 is a timing diagram depicting various disclosed aspects.

FIG. 5 is a timing diagram depicting various aspects. As depicted in FIG. 5, Node A 501 would like to join a mesh network. Accordingly, as depicted at 502, Node A 501 passively scans a communication channel. Node B 503, which is already part of a mesh network, periodically transmits receive window start frames 505.

Node B 503 may be a mesh node configured with a power saving mode. Thus Node B 503 periodically transmits a short receive window start frame 505 indicating that an awake period or receive window (Rx Window) 507 is forthcoming. The awake period is the time frame in which Node B 503 will be awake and capable of receiving transmissions. As depicted at 504, Node B 503 transmits a receive window start frame which is detected by Node A 501.

Upon detection of the receive window start frame, Node A 501 may generate and transmit a probe request to Node B 503, during the awake period of Node B 503, as depicted at 506. Node B 503 responds to the received probe request with a probe response, as depicted at 508. All transmissions are performed according to the ruling channel access mechanism, for instance EDCA.

Figure 6:
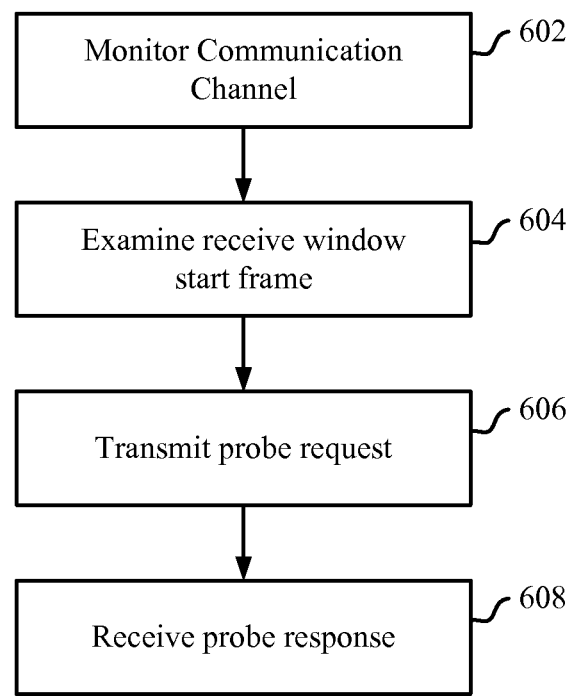
FIG. 6 is a flowchart depicting a scanning process, in accordance with various disclosed aspects.

FIG. 6 is a flowchart depicting a method of scanning mesh nodes. As depicted at 602, a device searching for a node monitors a communication channel. Monitoring may include passively listening to the channel in search of a receive window. Upon detection of a receive window start frame, the device examines the frame to determine whether a probe request should be sent, as depicted at 604. According to some aspects, the device may be pre-configured to seek a connection to predefined networks. In other aspects, the device may connect to any network from which it can receive communication. In some aspects, the start frame window may include indicia of the associated mesh network. For example, the start frame window may include all or part of the mesh network's mesh ID. Thus, the device can examine the start frame to determine whether to attempt to join the network. If the device is not pre-configured to join certain networks, the device may attempt to join any network for which it is has detected a member.

When the device decides to obtain further information about the network based on the received receive window start frame, it may transmit a probe request. The probe request is transmitted to be received during the awake window following the detected start frame, as depicted at 606. In response, the device receives a probe response, as depicted at 608, which provides further details concerning the mesh network and the device transmitting the probe response, possibly enabling the scanning device to join. For example, the probe response may include the full mesh ID, the name of the mesh node responding, the awake schedule of the mesh node responding, and/or other information. The probe response may be transmitted during or after the scheduled awake window. The probe response may proxy information regarding other mesh nodes. The probe request may be transmitted as a unicast frame.

Figure 7:
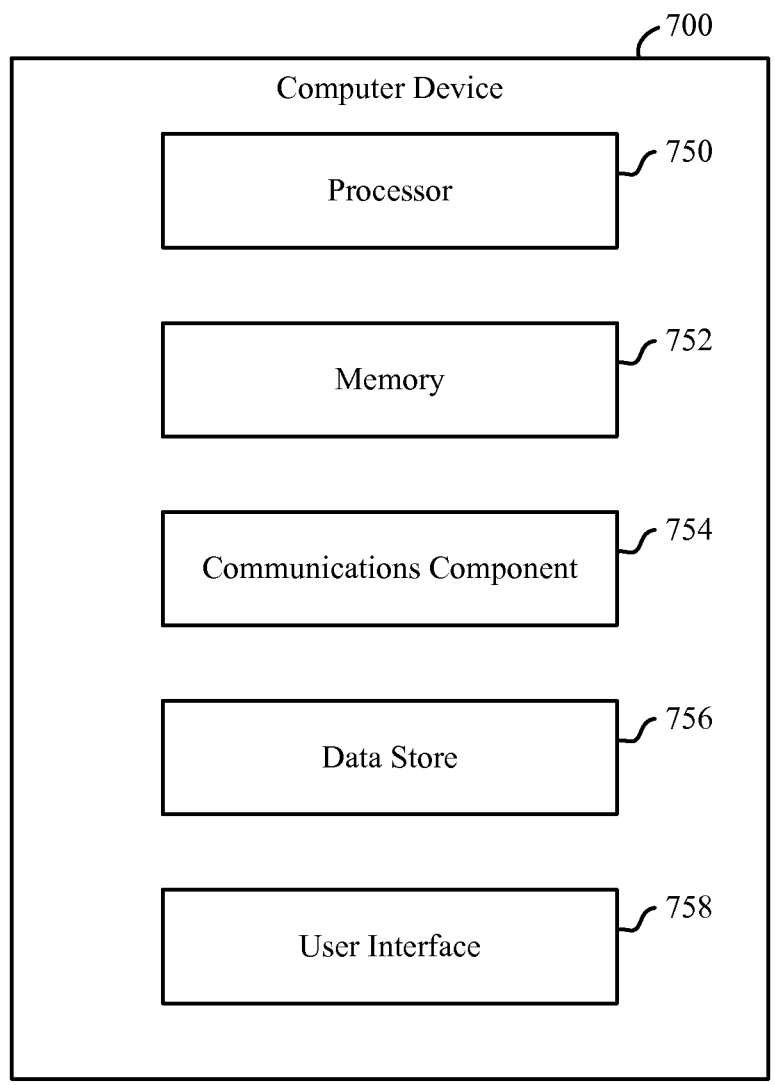
FIG. 7 depicts a wireless communication device in which various disclosed aspects may be implemented.

FIG. 7 depicts a wireless communications device 700 which may be used as a mesh node for example, to implement mesh points 200 (FIG. 2). Wireless communications device 700 includes processor component 750 for carrying out processing functions associated with one or more of components and functions described herein. Processor component 750 can include a single or multiple set of processors or multi-core processors. Moreover, processing component 750 can be implemented as an integrated processing system and/or a distributed processing system.

Wireless communications device 700 further includes a memory 752, such as for storing local versions of applications being executed by processor component 750. Memory 752 can include random access memory (RAM), read only memory (ROM), and a combination thereof.

Further, wireless communications device 700 includes a communications component 754 that provides for establishing and maintaining communications with one or more parties utilizing hardware, software, and services as described herein. Communications component 754 may carry communications between components on wireless communications device 700, as well as between wireless communications device 700 and external devices, such as devices located across a communications network and/or devices serially or locally connected to wireless communications device 700.

Additionally, wireless communications device 700 may further include a data store 756, which can be any suitable combination of hardware and/or software, that provides for mass storage of information, databases, and programs employed in connection with aspects described herein. For example, data store 756 may be a data repository for applications not currently executing.

Wireless communications device 700 may additionally include a user interface component 758 operable to receive inputs from a user of wireless communications device 700, and to generate outputs for presentation to the user. User interface component 758 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 758 may include one or more output devices, including but not limited to a display, a speaker, a haptic feedback mechanism, a printer, any other mechanism capable of presenting an output to a user, or any combination thereof.

Figure 8:
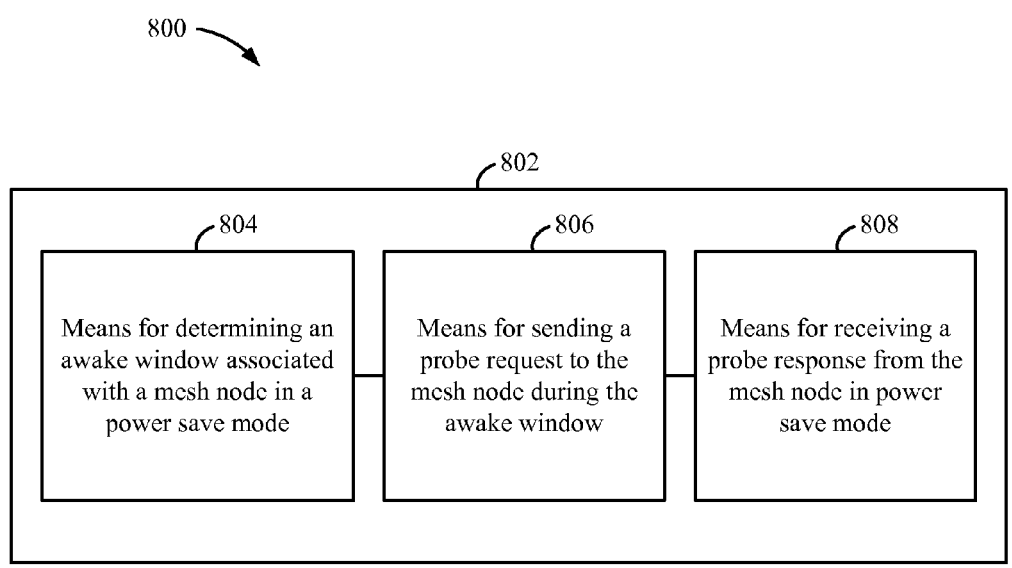
FIG. 8 depicts a system for receiving and processing data, in accordance with some aspects.

With reference to FIG. 8, illustrated is a system 800 that receives and processes messages received over a wireless mesh network. For example, system 800 can reside at least partially within a receiver, transmitter, mobile device, etc. It is to be appreciated that system 800 is represented as including functional blocks, which can be functional blocks that represent the functions implemented by a processor, software, or a combination thereof (e.g., firmware). System 800 includes a logical grouping 802 of electrical components that can act in conjunction. For instance, logical grouping 802 can include means for determining an awake window associated with a mesh node in a power save mode 804. Logical grouping 802 can also comprise means for sending a probe request to the mesh node during the awake window 806. Logical grouping 802 can further comprise means for receiving a probe response from the mesh node in power save mode 808.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for scanning for a mesh network, comprising:
monitoring, by a passively scanning node, a shared communication channel for an awake window of a mesh node in a power save mode;
detecting a receive window start frame associated with the awake window that is transmitted by the mesh node in the power save mode and prior to the awake window of the mesh node;
determining whether to send a probe request based on mesh network information included within the receive window start frame;
sending the probe request to the mesh node in accordance with a determination of the mesh network information included within the receive window start frame, wherein the probe request is received by the mesh node during the awake window;
receiving a probe response from the mesh node, wherein the probe response includes a set of information for the mesh network enabling the passively scanning node to join the mesh network; and
attempting to join the mesh network based on the probe response,
wherein the receive window start frame indicates that the awake window of the mesh node is upcoming, and wherein the receive window start frame is smaller in size than a beacon frame configured to indicate when transmitted by the mesh node that the mesh node is not in the power save mode.

2. The method of claim 1, further comprising:
repeating the monitoring for the awake window, the detecting of the receive window start frame, the determining whether to send a probe request, the sending of the probe request, the receiving of the probe response, and the attempting to join the mesh network, for multiple mesh nodes in the power save mode.

3. The method of claim 1, further comprising:
transmitting a broadcast probe request without waiting for the awake window to occur.

4. The method of claim 1, wherein the sending of the probe request comprises:
transmitting the probe request to the mesh node as a unicast frame.

5. The method of claim 1, wherein the sending of the probe request comprises:
sending a broadcast probe request to detect mesh nodes that are not in the power save mode.

6. The method of claim 1, wherein determining whether to send the probe request includes
examining the mesh network information prior to the sending of the probe request.

7. The method of claim 6, wherein the mesh network information includes first characters of a mesh ID of the mesh network.

8. The method of claim 1, further comprising:
searching for a pre-determined mesh node by a scanning station that is pre-configured to search for the pre-determined mesh node.

9. The method of claim 1, wherein the mesh network comprises at least one mesh node not in the power save mode that periodically transmits a plurality of receive window start frames indicating a permanent awake period.

10. The method of claim 1, wherein the mesh network includes at least one mesh node in the power save mode that periodically transmits a plurality of receive window start frames.

11. The method of claim 10, wherein each of the plurality of receive window start frames indicates an upcoming awake window.

12. The method of claim 1, further comprising:
determining a random number; and
waiting for a number of slots equal to the random number prior to transmitting data, wherein a length of the awake window is defined as a number of backoff slots, wherein the random number is less than or equal to the number of backoff slots.

13. The method of claim 12, wherein the determining of the random number is according to Enhanced Distributed Channel Access (EDCA).

14. The method of claim 1, wherein the receive window start frame indicates a length of the awake window.

15. The method of claim 1, wherein the probe response includes one or more of a mesh identifier, a mesh node identification of a responding mesh node, or an awake schedule of the responding mesh node.

16. The method of claim 1, wherein the probe response includes capability information of one or both of the mesh node within the mesh network or one or more additional nodes within a different mesh network.

17. An apparatus, comprising:
a processor;
a network scanning module configured to detect an awake window of a mesh node in a power save mode, wherein the network scanning module comprises:
a scanning engine for passively monitoring a shared communication channel to detect a receive window start frame associated with the awake window that is transmitted by the mesh node in the power save mode and prior to the awake window of the mesh node, and for determining whether to send a probe request based on mesh network information included within the receive window start frame, wherein the receive window start frame indicates that the awake window of the mesh node is upcoming; and
a probe exchange engine for transmitting the probe request to the mesh node during the awake window in accordance with a determination of the mesh network information included within the receive window start frame, and for receiving a probe response from the mesh node, wherein the probe request is received by the mesh node during the awake window and the probe response includes a set of information for the mesh network enabling the apparatus to join the mesh network; and
a communications component for attempting to join the mesh network based on the probe response,
wherein the receive window start frame is smaller in size than a beacon frame configured to indicate when transmitted by the mesh node that the mesh node is not in the power save mode.

18. The apparatus of claim 17, wherein the probe request is a broadcast message.

19. The apparatus of claim 17, wherein the probe request is a unicast message.

20. The apparatus of claim 17, wherein the probe exchange engine is configured to transmit the probe request upon detection of the receive window start frame.

21. The apparatus of claim 17, wherein the mesh network information includes first characters of a mesh ID of the mesh network.

22. The apparatus of claim 17, wherein the network scanning module is pre-configured to search for a predetermined mesh node.

23. The apparatus of claim 17, further comprising a power saving module for implementing the power save mode.

24. An apparatus, comprising:
- means for monitoring, at a passively scanning node, a shared communication channel for an awake window of a mesh node in a power save mode;
- means for detecting a receive window start frame associated with the awake window that is transmitted by the mesh node in the power save mode and prior to the awake window of the mesh node;
- means for determining whether to send a probe request based on mesh network information included within the receive window start frame;
- means for sending the probe request to the mesh node in accordance with a determination of the mesh network information included within the receive window start frame, wherein the probe request is received by the mesh node during the awake window;
- means for receiving a probe response from the mesh node, wherein the probe response includes a set of information for the mesh network enabling the passively scanning node to join the mesh network; and
- means for attempting to join the mesh network based on the probe response, wherein the receive window start frame indicates that the awake window of the mesh node is upcoming, and wherein the receive window start frame is smaller in size than a beacon frame configured to indicate when transmitted by the mesh node that the mesh node is not in the power save mode.

* * * * *